(12) United States Patent
Rosenbaum et al.

(10) Patent No.: US 7,590,260 B2
(45) Date of Patent: Sep. 15, 2009

(54) METHOD AND APPARATUS FOR VIDEO CODING BY VALIDATION MATRIX

(75) Inventors: Walter Rosenbaum, Paris (FR); Eberhard Mandler, Reichenau (DE)

(73) Assignee: Siemens Aktiengesellschaft, Munich (DE)

(*) Notice: Subject to any disclaimer, the term of this patent is extended or adjusted under 35 U.S.C. 154(b) by 1047 days.

(21) Appl. No.: 10/885,125

(22) Filed: Jul. 7, 2004

(65) Prior Publication Data

US 2005/0105767 A1 May 19, 2005

Related U.S. Application Data (60) Provisional application No. 60/520,658, filed on Nov. 18, 2003.

(30) Foreign Application Priority Data

Sep. 25, 2003 (DE) ............................... 103 44 576

(51) Int. Cl.
*G06K 9/00* (2006.01)
*G06Q 20/00* (2006.01)
(52) U.S. Cl. ........................... 382/101; 382/321; 705/62
(58) Field of Classification Search ......... 382/100–102, 382/106, 108, 113, 140, 141, 165, 175, 193, 382/179–181, 189, 196, 209, 232, 235, 237, 382/290, 309–311, 321; 705/1, 62; 209/546; 707/104.1
See application file for complete search history.

(56) References Cited

U.S. PATENT DOCUMENTS

| 4,992,649 | A | * | 2/1991 | Mampe et al. .............. 209/546 |
| 5,455,875 | A | * | 10/1995 | Chevion et al. ............. 382/311 |
| 5,668,990 | A | * | 9/1997 | Bajorinas et al. ......... 707/104.1 |
| 5,697,504 | A | * | 12/1997 | Hiramatsu et al. .......... 209/546 |
| 6,816,838 | B1 | * | 11/2004 | Ryan, Jr. ....................... 705/1 |
| 7,069,247 | B1 | * | 6/2006 | Oppedahl .................... 705/62 |
| 2004/0211838 | A1 | | 10/2004 | O'Callaghan et al. |
| 2005/0167342 | A1 | | 8/2005 | Vullriede et al. |

FOREIGN PATENT DOCUMENTS

WO WO 02/082235 A2 10/2002

* cited by examiner

*Primary Examiner*—Seyed Azarian
(74) *Attorney, Agent, or Firm*—Laurence A. Greenberg; Werner H. Stemer; Ralph E. Locher (57) ABSTRACT

The present invention relates to a system and method for resolving non-address attributes on a mail piece. The present system uses a mail sorter for sorting and facilitating the obtaining of a scan of the mail piece. The image is then scanned by automatic means to determine whether the non-address attributes can be automatically resolved. In the event of an unsuccessful scan, the image is forwarded to a processor which makes a functional resolution of the non-address attribute, locates example attributes and ranks them, and creates a matrix with the example attribute in the cognitive zone. The matrix is displayed to a coder who then quickly identifies whether or not the attribute and example attribute match. In the event of a non-match, a matrix with a next highest rank example attribute is created and forwarded to the encoder until no more example attributes remain, wherein the entire image is forwarded to the encoder.

25 Claims, 12 Drawing Sheets

METHOD AND APPARATUS FOR VIDEO CODING BY VALIDATION MATRIX

CROSS REFERENCE TO RELATED APPLICATIONS

The present invention claims priority to provisional patent application Ser. No. 60/520,658, filed Nov. 18, 2003, which is herein incorporated by reference.

BACKGROUND OF THE INVENTION

The present invention relates to the field of mail processing and more particularly to a system and method for resolving non-address attributes on an address face of a postal item.

Non-address attributes as used herein include: stamps, pictorial representations, alpha numeric characters, stylized and non-formatted textual fields, postal endorsements, logos, and markings and the like whose resolution is desired and/or necessary for effective sorting of the respective mail piece and for associated applications such as Mail Forwarding and Return to Sender functions.

Current and prior attribute resolution systems perform automatic address reading via optical character recognition software (OCR). An example system is set out in German Patent DE 195 31 392 C1. Ideally, current mail handling automation would include some form of non-address attribute recognition. However, non-address attributes defy current automation rules including a lack of redundancy and standardization among the many non-address attribute candidates. Accordingly, with current resolution techniques, reject and error rates are higher than with address attribute resolution. As with address attributes, when an unresolveable non-address attribute is encountered with current automatic resolutions means, the image containing the unresolvable attribute is forwarded to a video coder for manual resolution. Per standard encoder techniques, a video encoder, sitting at a video encoding station, receives an image on a display (typically a computer monitor), analyzes the image for the missing/unresolvable attributes and manually keys in or enters information which could not have otherwise been obtained automatically. Thresholds of confidence are used to determine when an attribute has not been resolved and the entire image must be manually encoded.

Figure 1:
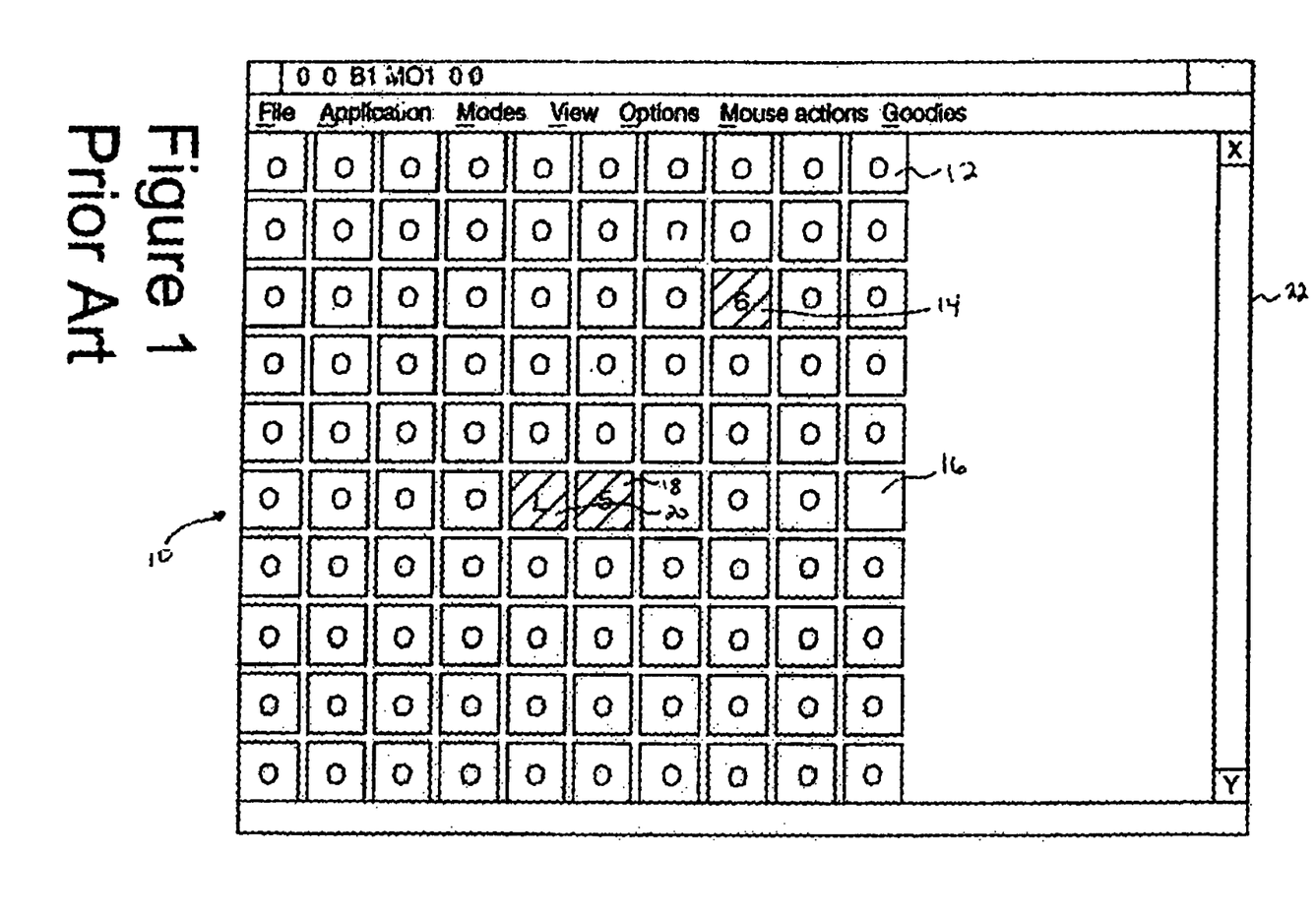
FIG. 1 depicts a prior art matrix without a cognitive zone.

To assist encoders, methods have been proposed wherein the encoder's attention is brought to a particular portion of the image (area of interest) where it is believed (by the method) that the non-resolvable attribute is present. Additionally, encoder communication of information has been reduced, in some circumstances to a single key stroke. However, despite such aids, manual encoding remains an inefficient solution because oftentimes, zooming and other manually scanning is required and information is not always communicatable with a single key stroke. Attempts have been made in making manual encoding more efficient by reducing the number of steps required by an encoder to arrive at a non-address attribute image location as well as the number of key strokes required for resolution. One solution, proposed by U.S. Pat. No. 5,455,875, includes the use of truthing tables. In truthing tables, portions of images are presented in matrix format. The truthing matrix per the above patent contains non-resolvable attributes clustered by what the recognition logic believed them to be. The belief is based on a partial resolution of the unresolvable attribute, wherein the partial resolution fell below a confidence threshold. A prior art matrix from the '875 patent is depicted in FIG. 1 (with reference numbers added for clarity). The matrix entries include different backgrounds to denote where the operator flagged non-matches.

As depicted in FIG. 1, a matrix 10 is presented to a viewer on computer screen 22. The matrix comprises a plurality of boxes 12 having or depicting a "O" therein. Exceptions flagged by the operator are depicted as having a hatched background and depict a "6" (element 14), "L" (element 20) and "5" (element 18). The matrix of FIG. 1 is limited in application to distinguishing single, well recognizable to the operator, alpha-numeric characters. Likewise, non-address attributes comprise more than the single digits analyzed by the '875 reference and complex ad hoc classes of patterns are not effectively handle by the method. Accordingly, a need exists for increasing mail sorting throughput via recognition of complex, non-address attributes.

SUMMARY OF THE INVENTION

An objective of the present invention is to provide a system and method for more effective video coding of non-address attributes as required for automation of mail processing and, in particular, to increase productivity while at the same time decrease operator error rate from existing methods of video coding non-address attributes. An additional objective is that the basic system and method to be described can be application-wise extended beyond the previously mentioned examples of non-address attributes (i.e. stamp classification and endorsement) to include filtering of patterns whether they are structured, such as conventional alphabets, or are an arbitrary grouping of shapes. Yet another objective is to increase the level of work satisfaction of coding operators through exposure to non-keying intensive tasks and ones that use aspects of the operators' cognitive intellect. These and other advantages are made available by the present invention.

The present system comprises means for executing the above described inventive method. The present system includes a feeding mechanism for handling the mail pieces, the feeding mechanism comprising means for running mail pieces past a high resolution scanner or similar image lift device. An image, created by the scanner, is forwarded to at least one processor for resolution. In the event the non-address attributes are unresolveable, a second processor and database are consulted for creation of the aforementioned matrix, however, the present matrix includes a Cognitive Zone. The cognitive zone includes example non-address attributes which may match the unresolved non-address attributes. The Cognitive Zone is centrally located and may comprise a single or column entry or row entry. The matrix is then forwarded via appropriate means to one of a plurality of video coding stations for decoding.

The present invention also comprises a method for performing non-address attribute resolution using the above mentioned system. According to the present method, an image is created and non-address attributes therein are resolved by automatic means. A determination as to whether Automatic resolution was successful is performed. A successful determination is one that rises above a particular threshold. Unsuccessfully resolved attributes that have a recognition affinity to a given attribute class but where below the successful recognition threshold are assigned to a matrix designated for said attribute class. A cognitive zone made up of example attribute(s) is inserted into the matrix and the matrix forwarded to an encoder for manual encoding. The example attributes in the cognition zone are arrived at by matching the non-resolved attributes with example attributes believed to be a match, the matching rated by level of confidence. Because the confidence level of the initial resolution is not high, it is not always a guarantee that the example attribute displayed in the cognitive zone will match the non-resolved attribute. If the encoder indicates that the non-resolved attribute does not match the example attribute in the cognitive zone, the subject reject attribute is reassessed according to its next highest likelihood recognition and inserted as one of the candidates in a second matrix with a cognitive zone composed of examples related to this new recognition alternative. The present method includes other steps detailed below.

When an non-match is indicated, a second matrix is created using example attributes having a next highest match confidence level. The second matrix is presented to the encoder for manual matching. This occurs for additional matrices until the match confidence level falls below a preset threshold; at which time the entire image is presented to encoder for manual encoding.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 2:
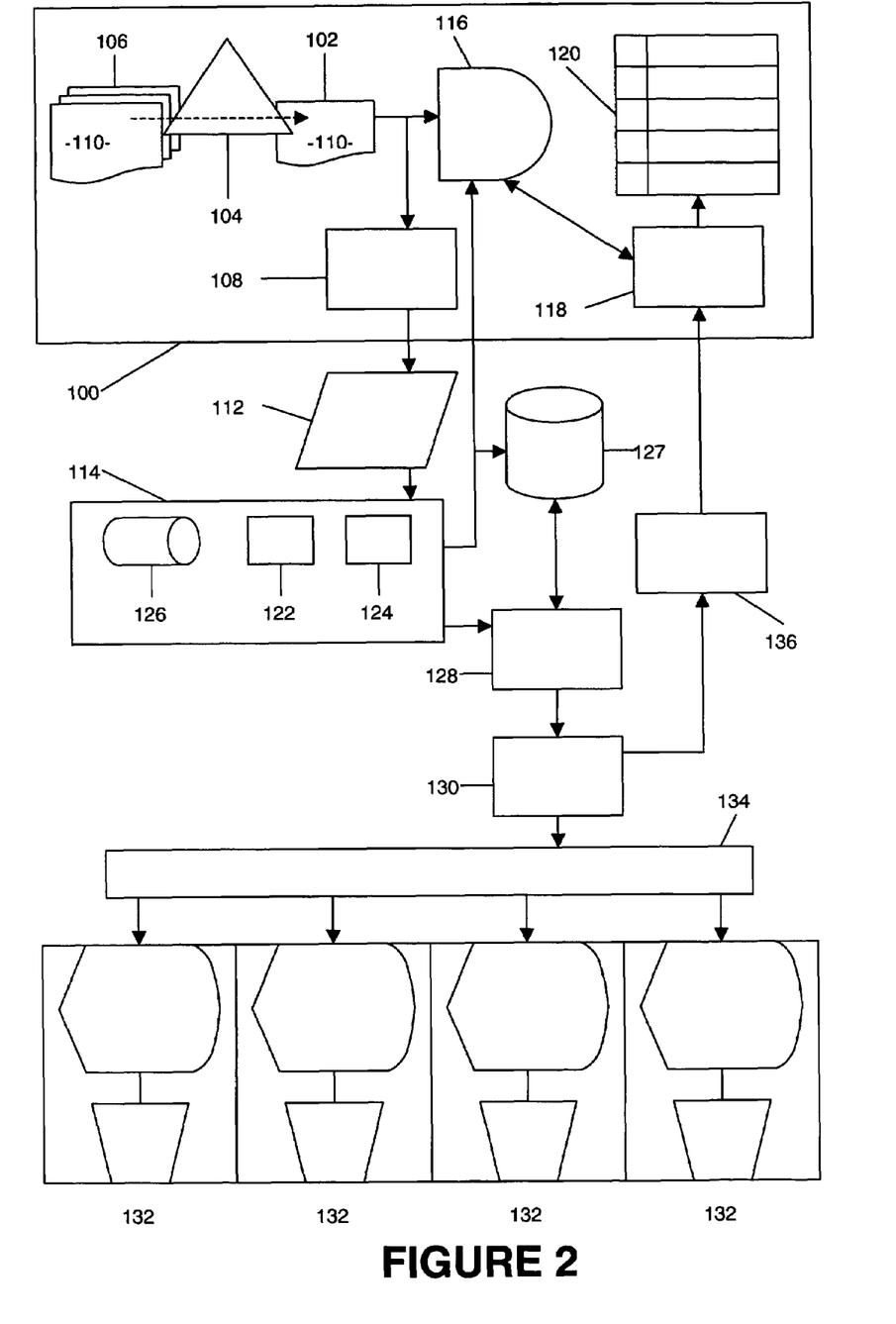
FIG. 2 depicts the present system in schematic form.

FIG. 2 depicts a schematic of a non-address attribute resolution system according to the present invention. As shown, the present system includes a mail sorter 100 for removing and sorting mail pieces or items 102. The mail sorter is able to sort mail when the non-address attributes are automatically resolved or resolved by coding.

Mail sorter 100 includes a feeding mechanism 104 which pulls successive mail pieces 102 from magazine 106. The mail pieces 102 are transported to a high-resolution video scanner 108 for automatic scanning of a mail piece address surface 110 and generating an image 112 thereof. The mail pieces 102 may be transported at a rate of approximately 10 mail pieces per second by means known in the art. Although the scanning of the mail piece address face is discussed herein, such should be understood as an embodiment of the present invention with another embodiment including the scanning of a non-address face of the mail piece.

The image 112 is directed to OCR and pattern matching element 114. Element 114 includes at least one microprocessor 122, memory 124, and address register or database 126 interconnected so as to be to automatically resolve and decode image 122 with a high degree of confidence. The actual level considered "high" is set by application as known to one skilled in the art. High confidence degree resolution includes resolution of both address and non-address attributes. Address attributes include alphanumeric characters indicative of a postal or destination address. Non-address attributes include stamps, pictorial representations, alpha numeric characters (i.e. endorsements), markings and the like.

Prior to and concurrent with image resolution at element 114, the mail piece 102 is held in a delay loop a delay loop 116. Should the image be resolvable with the high degree of confidence, a bar code is made to be printed on the mail piece at printer 118 and the mail piece is forwarded to sorting bins 120 where further sorting with the aid of the bar code ensues. Unsuccessfully read images are stored in database 127.

Processor 128 is arranged in communication with database 127 and processors 114. Processor 128 as with processors 114, receives an image and resolves it. However, with processor 128, the image is taken or received from database 127 and the resolution is to a lower or functional degree of confidence. In an alternative embodiment, the lower or functional degree resolution may be effected by processors 114. A functional degree of confidence is one where it is likely or possible to identify the general nature of the non-address attribute to a degree so as to find possible matches in the form of example non-address attributes. Once obtained, the functional degree is then compared with example attributes stored in database 127 for a possible match. To facilitate this, a search is made of database 127 for best possible matches ranked upon their degree of match confidence. Typically, more than one possible match is determined given the lower degree of confidence from which the process begins. Alternatively, database 126 may substitute for database 127. Typically, the search will produced Confidence for the match may be at least at the functional level. Finally, processor 128 includes appropriate programming for the creation of a matrix including the cognitive zone. The functional non-address attributes occupy the matrix but for the cognitive zone which is made to be occupied by the example attributes. The newly created matrix is then forwarded to an order sorting element 130 for further communication to one of a plurality of video coding stations 132. By way of example, four video coding stations 132 are depicted. The video coding stations 132 may be networked via a local area network 134. The bar code printer 136 is included and arranged in communication with sorting device 130. In operation, when an image is unsuccessfully read, the printer 136 is made to print a tracking (TID) bar code on the respective mail piece which is then directed to a suitably long delay loop to enable manual/on-line resolving or specially held to enable off-line resolving. As is known in the art, the TID bar code enables the mail piece to later rejoin the successfully read mail pieces in sorting via, e.g. bins 120. As an alternative to the TID printer actually printing the bar code, bar code printer 118 can be made to print the bar code as is depicted in FIG. 2. Should the video encoder indicate that a non-match occurred between the resolved non-address attribute and the example non-address attribute in the cognitive zone, the processor 128 is made to create a second matrix with another attribute having a lower degree of confidence. Should another non-match occurs, another matrix is created an so on until no more example attributes are available. At this point, the entire image is shown to the encoder for manual encoding.

Figure 3:
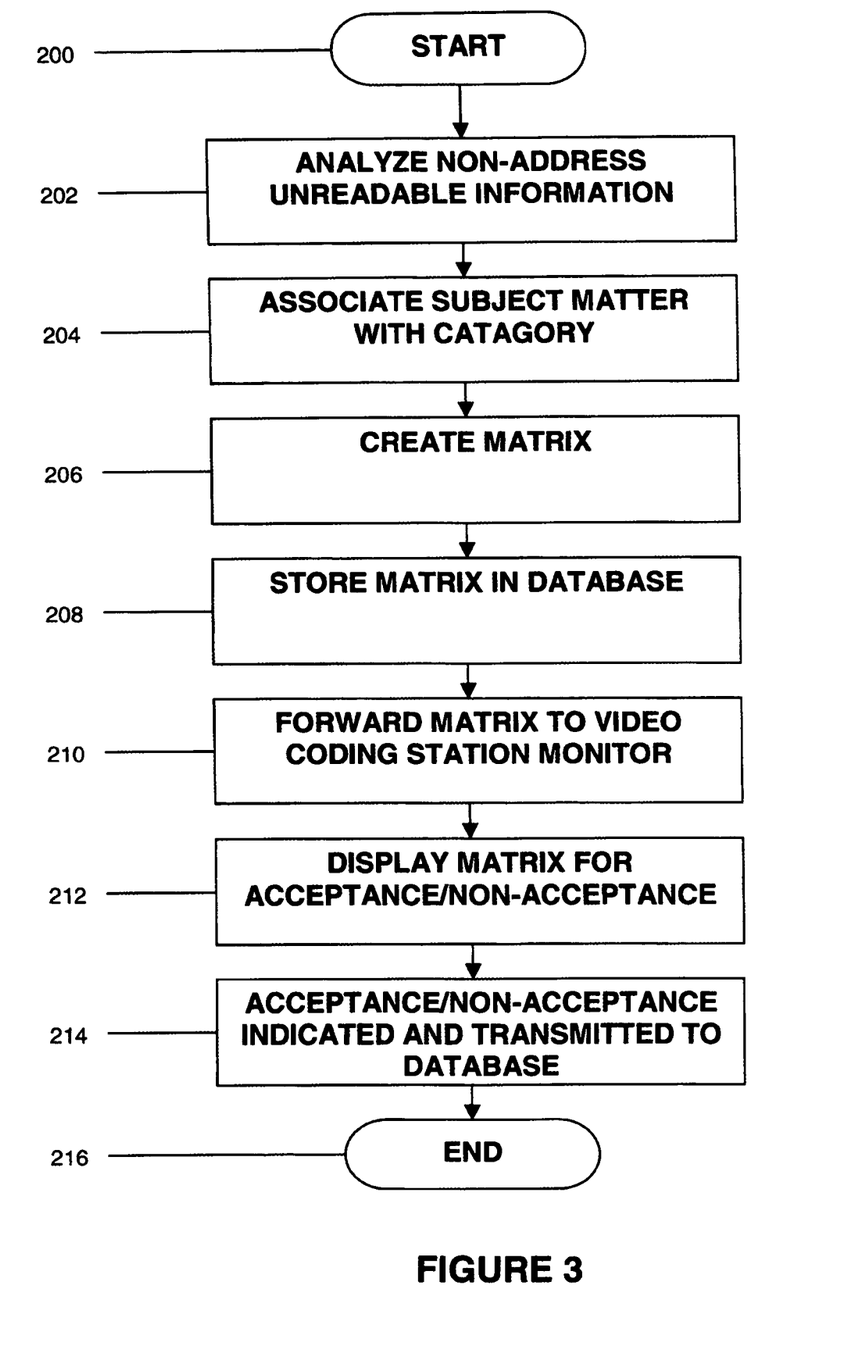
FIGS. 3, 3a and 3b depict a flow chart of the present method.

FIG. 3 depicts a flowchart of the present method for resolving unsuccessfully read non-address attributes. The unsuccessfully read image 112 is stored in database 127 and it is with this image that the method starts (step 200).

In step 202, an analysis of the unresolvable non-address attribute is made. Given that the information was not automatically readable, a lower recognition level is herein employed.

In step 204, the now somewhat resolved non-address attribute is matched or associated with an appropriate attribute category. This step is effected by the substeps of searching the various available categories and determining which category and/or attribute that best matches what is known about the functionally resolved attribute. The categories and example attributes (resolution permitting) are ranked by degree of matching confidence. In step 206, a validation matrix is created comprising a plurality of attributes from an appropriate matching attribute category arranged in the cognitive zone. The matrix and cognitive zone may vary in size by application. In step 208, the matrix is stored in one of the above mentioned databases, i.e. database 127.

In step 210, the matrix is forwarded to at least one of the video coding stations 132 via means described above.

In step 212, the matrix is displayed for the coding station operator. The operator then indicates where a match exists or non-match by application. Should all the unresolved non-address attributes match the example attributes, it would be at the coders option to indicate this via a single key stroke. Such indication may be effected by known man-machine interfaces. In step 214, acceptance or non-acceptance are indicated by the operator and transmitted to processor 128.

In step 216, a determination is made whether a non-match was indicated. If a match was indicated 218, the method via connector D, 252, to step 240 set out below. If a match was not indicated 220, the method continues, via connector A 222/224.

Figure 3A:
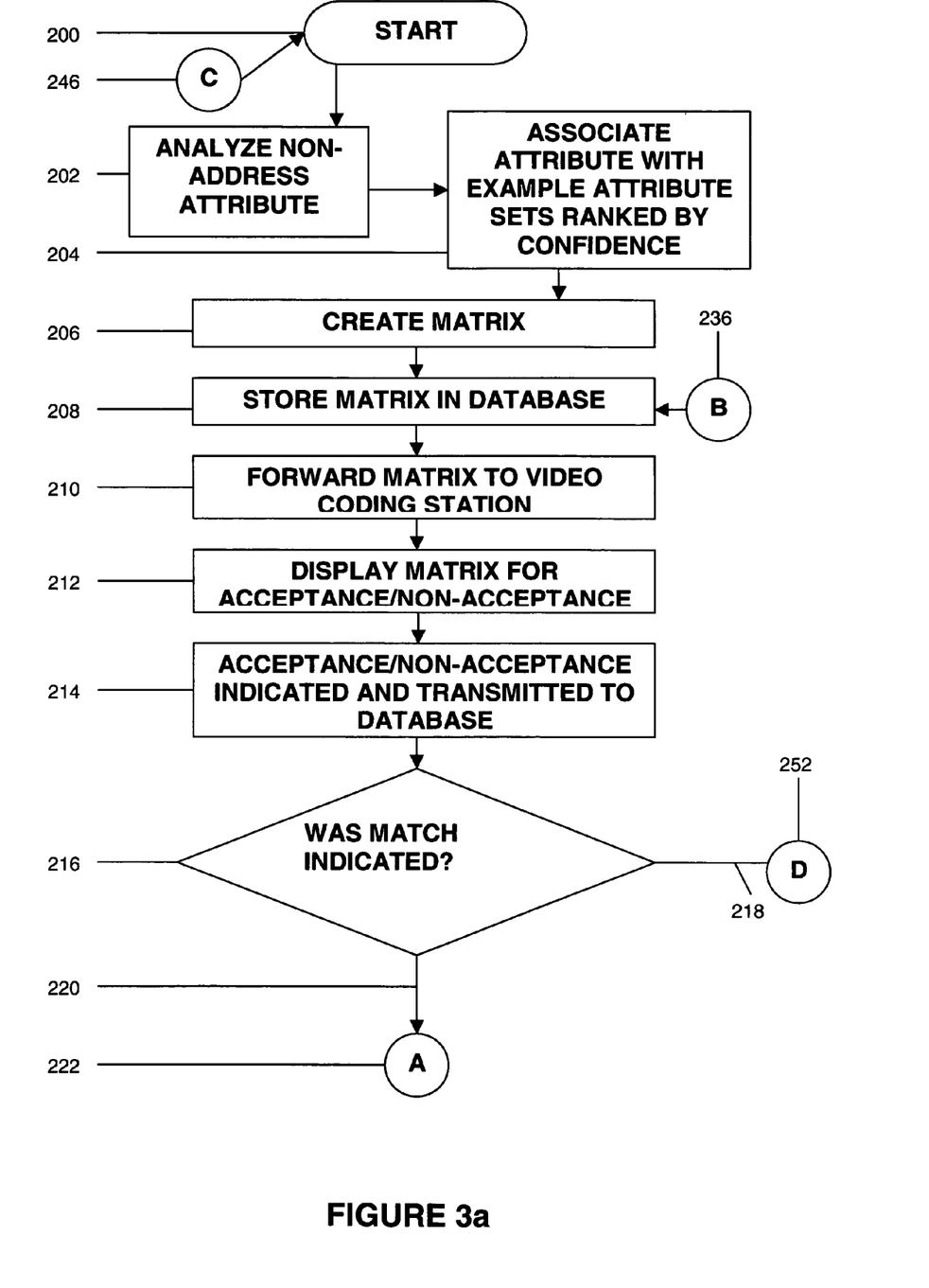
Figure 3B:
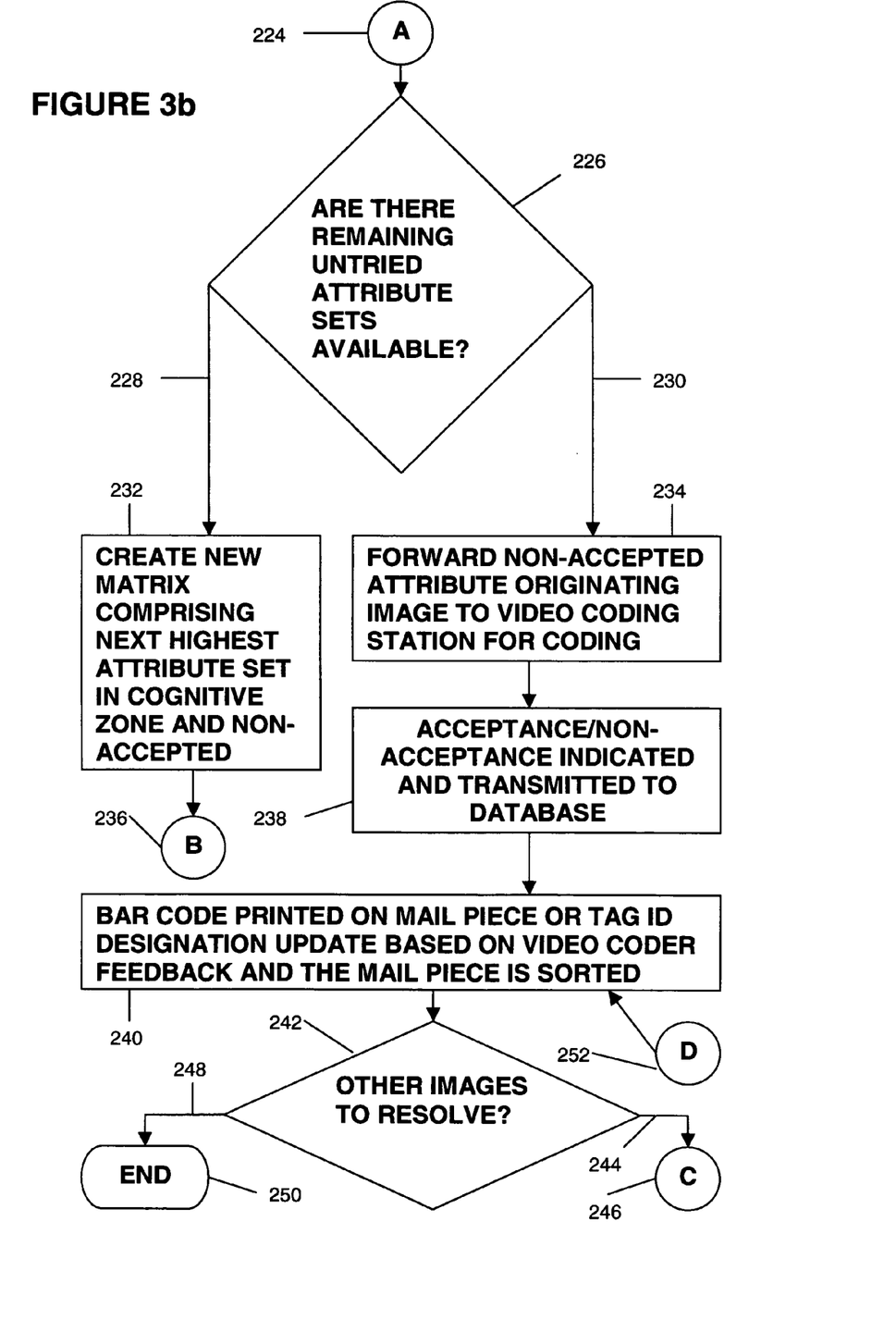

In step 224, the method continues to a determination. In step 226, a determination is made whether there are untried example attributes available for a matrix. If there are no more example attributes 230, the image containing the non-resolved non-address attribute is forwarded to the encoder in step 234.

In step 238, the encoder's match indication is transmitted to database 128.

In step 240, a bar code is printed or a TID is updated to reflect the final decision arrived at using the resolution of the non-address attribute by the encoder. The mail piece may be sorted accordingly.

In step 242, a determination is made whether there are other mail piece images to be resolved. If no more are present, 248, the method ends 250. If additional images are present 244, the method loops back via connector C, 246, to start 200.

Returning to step 226, if it is determined that additional example attributes are available, a new matrix comprising the new example attributes in the cognitive zone is created and, via connector B, 236, the method loops back to step 208 whereby the new matrix is considered as was the previous one.

Figure 4:
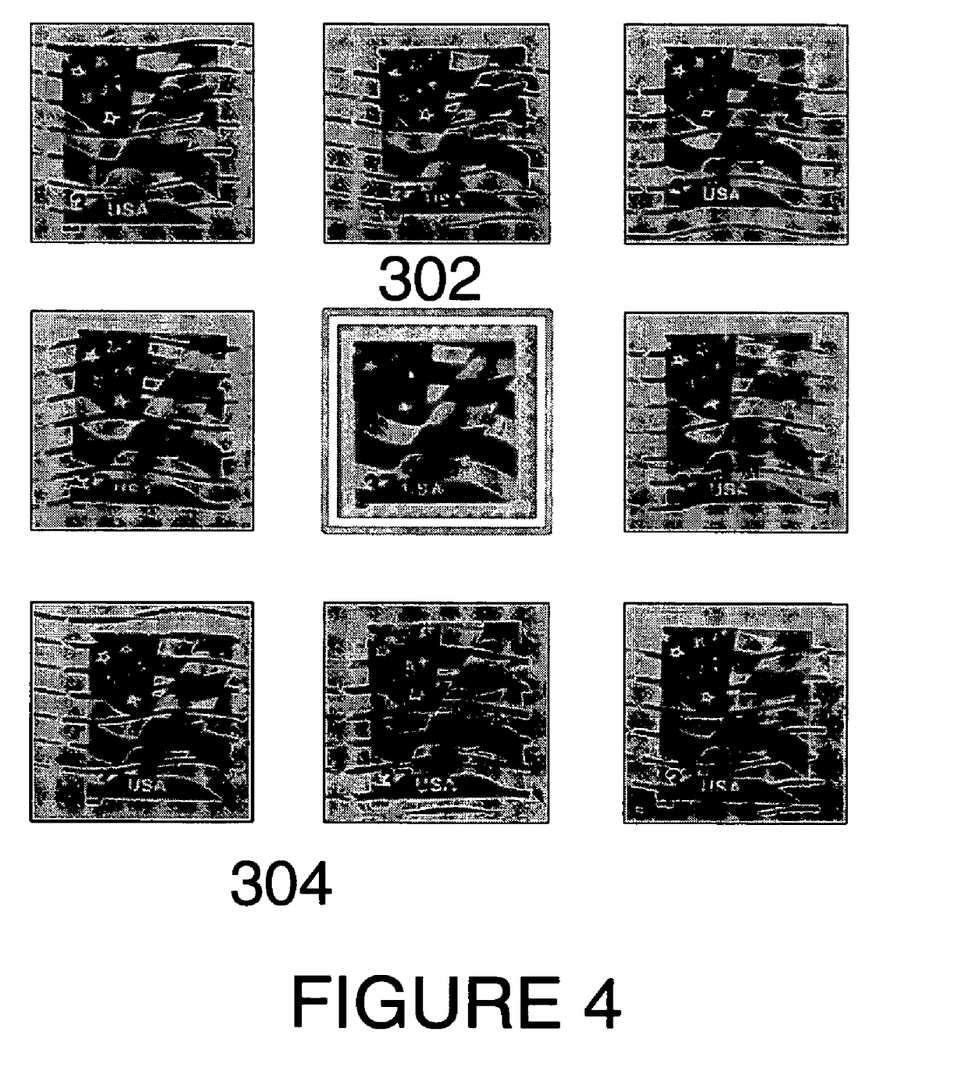
FIG. 4 depicts a 3×3 matrix with a cognitive zone comprising a single central entry.

FIG. 4 depicts a 3×3 matrix 300 with a cognitive zone 302 being a single example attribute located at the center thereof. The non-address attribute is an American flag. Herein, the encoder would depress a single key indicating the entire matrix 300 matches the cognitive zone 302 attribute.

Figure 5:
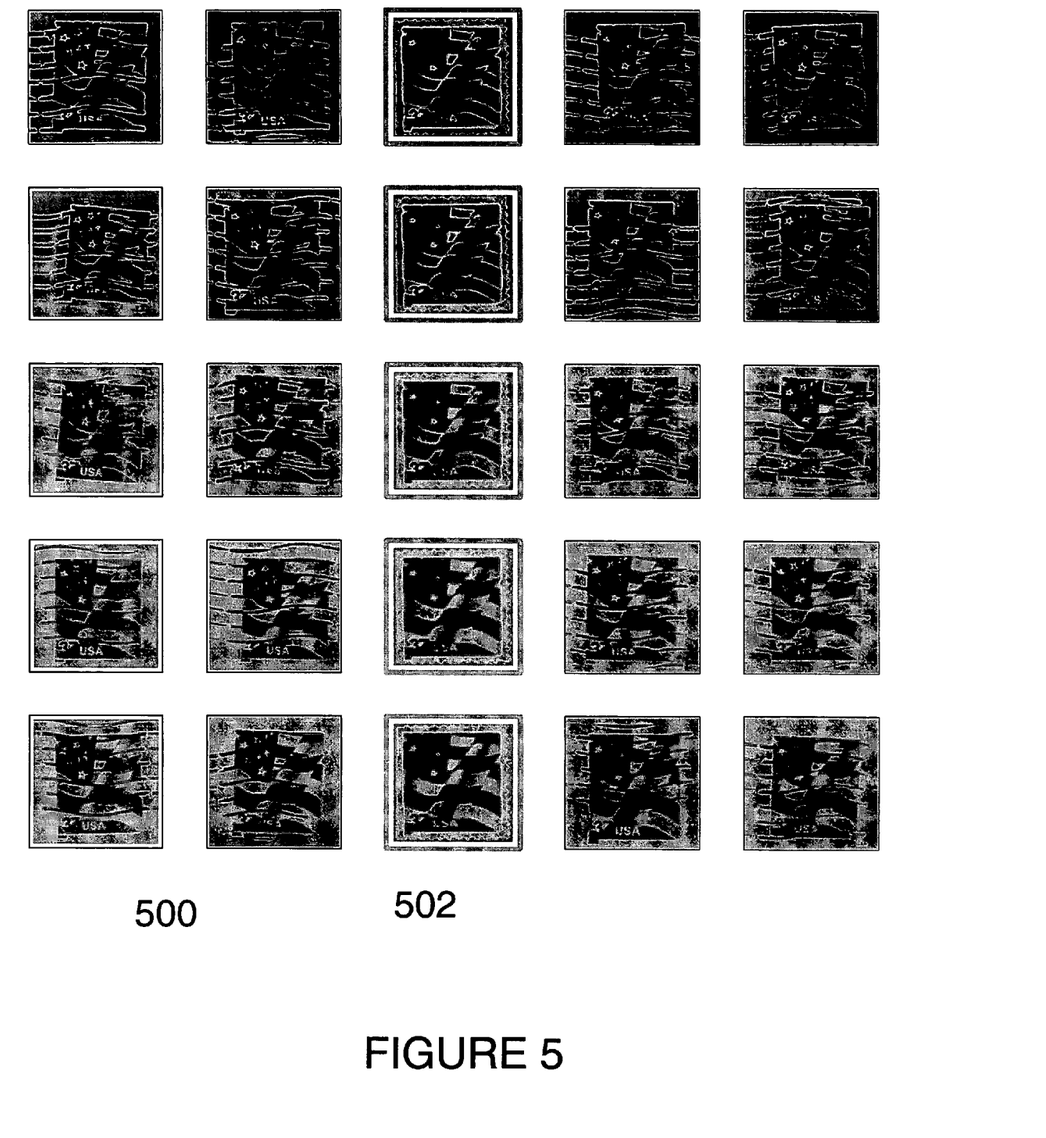
FIG. 5 depicts a 5×5 matrix with a cognitive zone comprising a central column.

FIG. 5 depicts a 5×5 matrix 500 of American flags with a cognitive zone 502 being a column running the center of the matrix. Again, the encoder would indicate an overall match via a single key stroke. Alternatively, the encoder may highlight a match or non-match with a pointer and a mouse click. Other such indication methods may be employed as envisioned by one skilled in the art.

Figure 6:
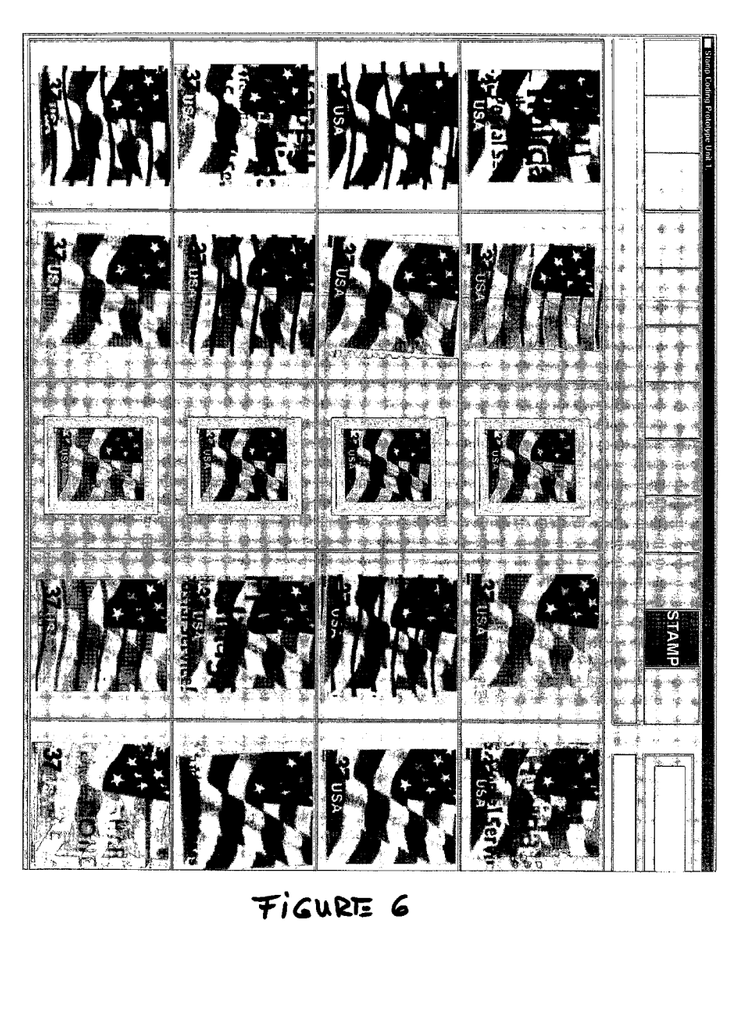
FIG. 6 depicts 5×4 matrix with a cognitive zone comprising a central column.

FIG. 6 depicts a 5×4 matrix 600 as would be displayed on a computer monitor 602. The cognitive zone 604 runs the center of the matrix. The matrix 600 comprises American flags with all matches which again could be so indicated with a single key stroke.

Figure 7:
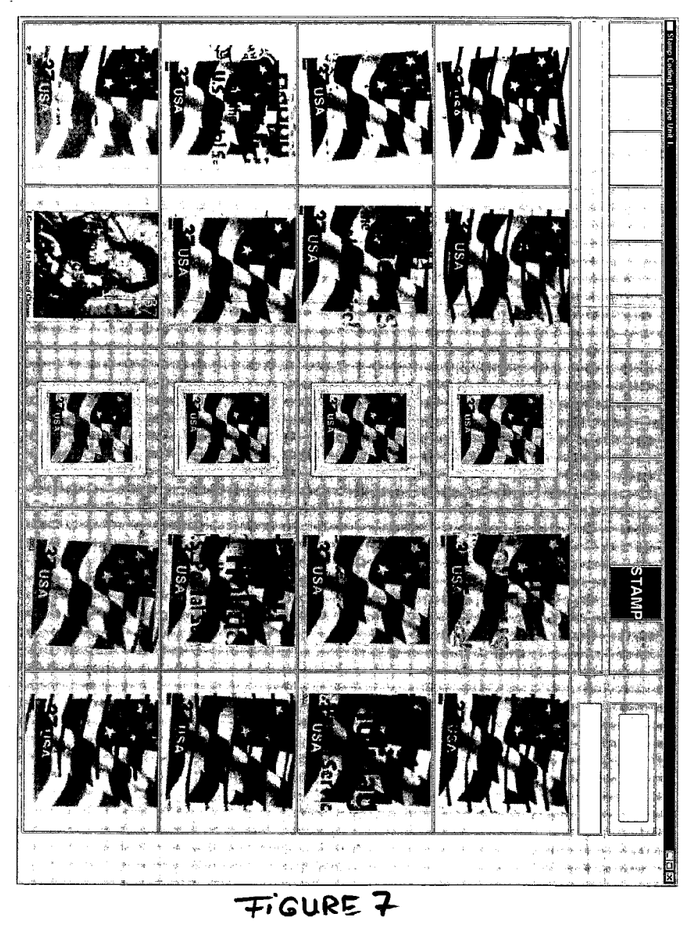
FIG. 7 depicts a 5×4 with two non-matching non-address attributes.

FIG. 7 depicts a 5×4 matrix 700 of stamps depicting George Washington. The matrix is depicted as it would appear on a computer monitor 702. The cognitive zone 704 is a column running the center of the matrix. Herein there are two non-matching attributes 706. The encoder would indicate the non-match via man-machine interface, such as a key stroke or mouse pointer.

Figure 8:
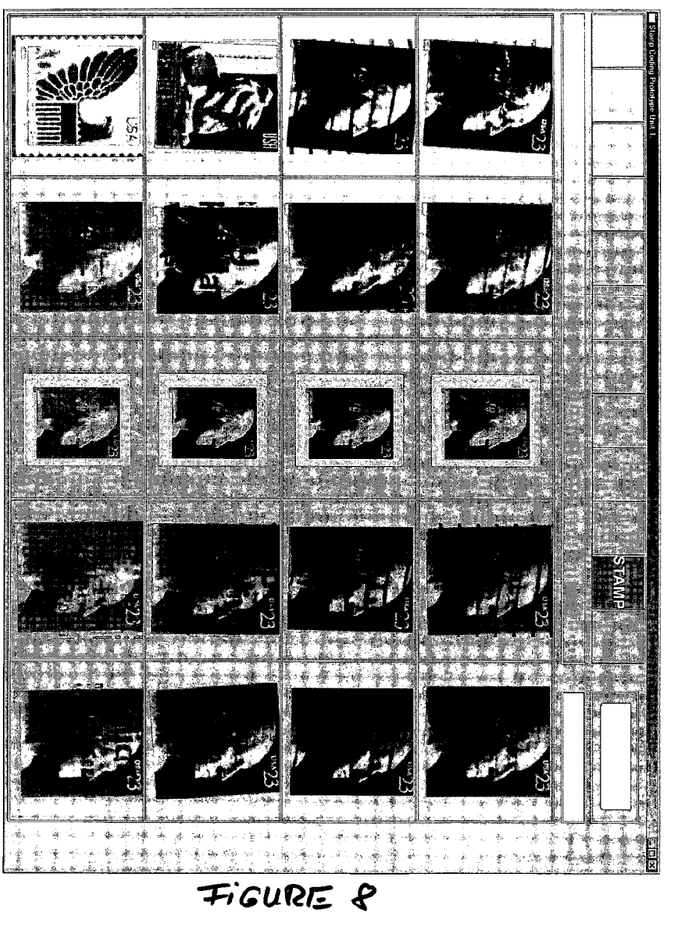
FIG. 8 depicts a 5×4 matrix with one non-matching non-address attribute.

FIG. 8 depicts a 5×4 matrix 800 of American flags as would be depicted on a computer monitor 802 with cognitive zone 804 running down the center. Herein a single attribute 806 is non-matching. In operation, another matrix would be created with another example attribute that may match attribute 806. The current example attribute of an American flag was initially considered because the cancellation of the non-matching attribute 806 included wavy lines akin to the flag.

Figure 9:
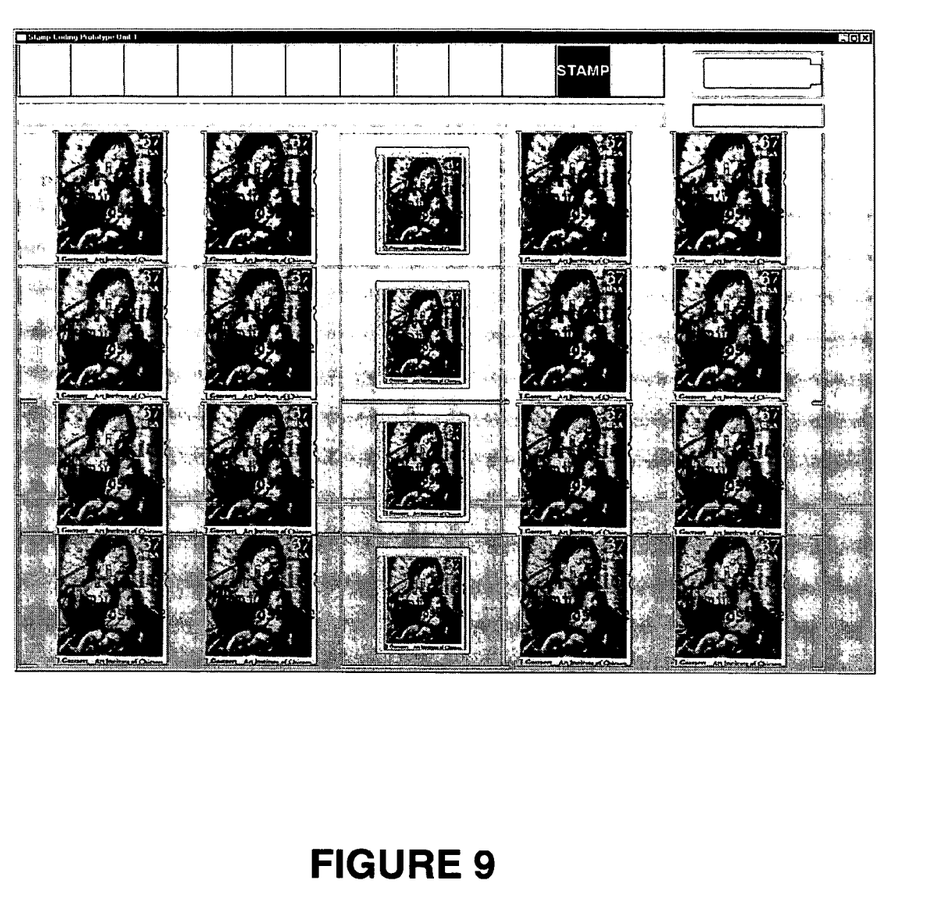
FIG. 9 depicts a 5×4 matrix with another example attribute from FIG. 8 in the cognitive zone.
Figure 10:
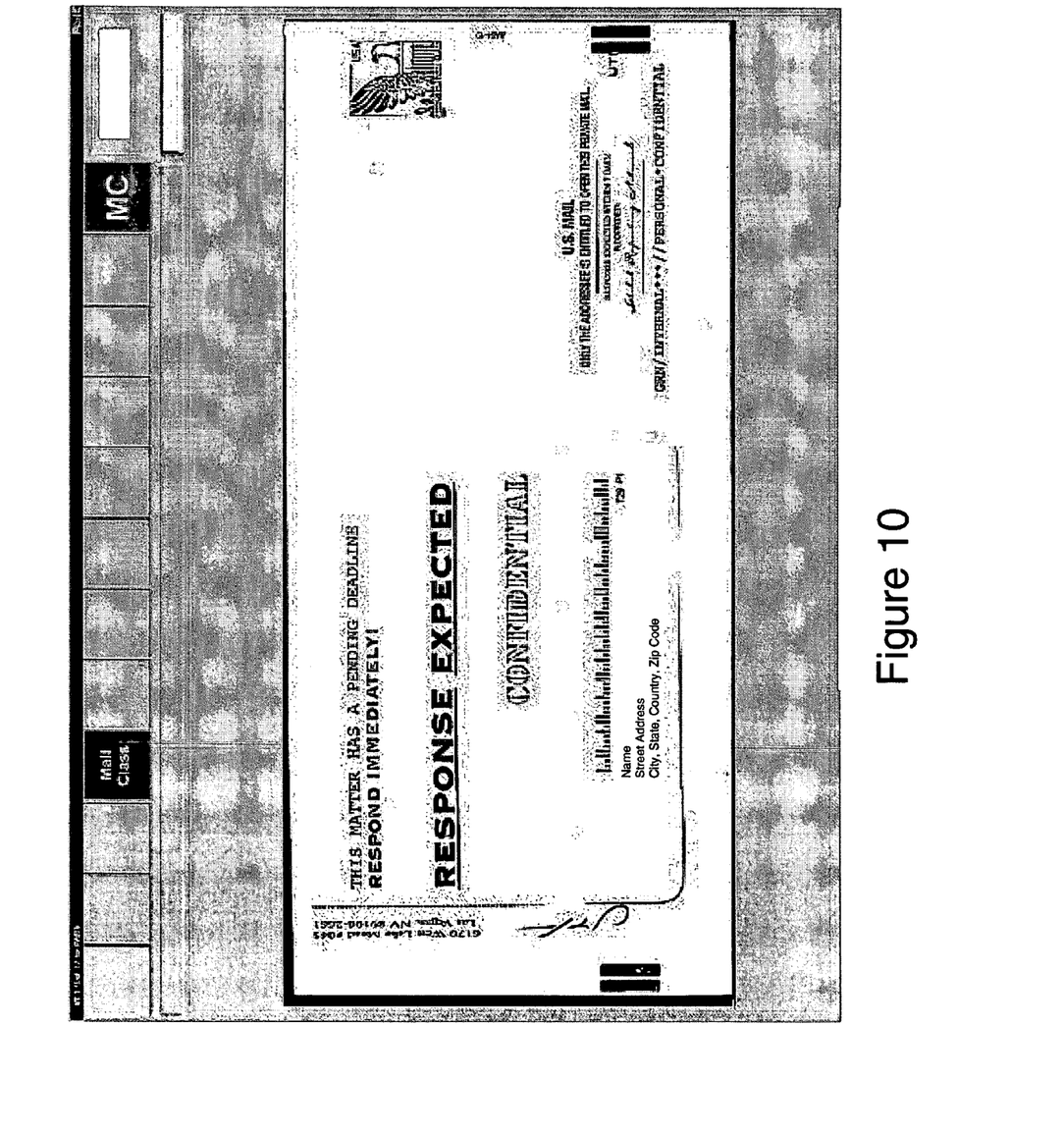
FIG. 10 depicts an image containing an example non-resolvable non-address attribute.

FIG. 9 depicts a 5×4 matrix 900 of Madonna and Child as would be depicted on a computer monitor 902 with cognitive zone 904 running down the center. Herein a match is exhibited and the present invention would print an appropriate bar code based on the match indication, sort the mail piece and return to start. FIG. 10 depicts a whole image of a non-resolvable non-address attribute that would be depicted to the encoder in the event all the example attributes were exhausted.

The present invention having been presented above will be further set out in the appending claims. The above description is one embodiment of the invention leaving open the possibility for other embodiments and uses which would not depart from the spirit of the invention. For example, the present application may be used for the resolution of stamps, various groupings of letters and/or numbers and/or pictures, signatures, markings and so forth.

We claim:

1. A system for coding a non-address attribute of a mail piece image, comprising:
   means for generating the image;
   means for resolving the non-address attributes;
   means for generating a matrix comprising unresolved non-address attributes and example non-address attributes positioned in a cognitive zone, wherein the example non-address attributes are possible matches for the unresolved non-address attributes,
   wherein the means for generating a matrix comprises at least one processor,
   wherein the at least one processor includes means for resolving the non-address attribute with a functional degree of confidence, means for querying a database for possible matching example attributes to the non-address attribute and means for ranking results of the querying by degree of match confidence,
   wherein the at least one processor further comprises means for generating successive matrices comprising example attributes in the cognitive zone, the successive example attributes having lower degrees of match confidence;
   means for displaying the matrix to an operator; and
   at least one video coding station in communication with the at least one processor so as to receive the matrix and respond with an indication of match between example attribute and non-address attribute.

2. The system according to claim 1, wherein the means for generating an image comprises an optical character recognition mail sorter, and the mail piece image comprises an address face of the mail piece.

3. The system according to claim 2, wherein the mail sorter comprises:
   a feed mechanism arranged to remove mail pieces from magazines;
   a scanner arranged to generate the image of the mail pieces;
   a delay loop arranged to temporarily accommodate mail pieces while their non-address attributes are being resolved;
   a bar code printer arranged to print a bar code on the mail piece; and
   sorting bins arranged to facilitate sorting of the mail pieces.

4. The system according to claim 1, wherein the means for resolving non-address attributes comprises at least one processor programmed to resolve the non-address attributes with a high degree of confidence.

5. The system according to claim 4, wherein the means for resolving non-address attributes further comprises at least one processor programmed to resolve the non-address attributes with a functional degree of confidence such that the functional degree is less than the high degree.

6. The system according to claim 5, wherein the at least one processor comprises a pattern match processor and a logical processing unit, and the system comprises:
   at least one database arranged in communication with the at least one processor and comprising means for storing and facilitating selective retrieval of a plurality of example non-address attributes; and
   a bar code printer arranged in communication with the at least one processor for effecting a print upon a mail piece.

7. The system according to claim 1, wherein the means for resolving non-address attributes comprises at least one processor programmed to resolve the non-address attributes with a functional degree of confidence.

8. The system according to claim 1, wherein the means for resolving comprises optical character recognition means or pattern matching means.

9. The system according to claim 1, wherein the at least one processor for generating a matrix is the means for resolving non-address attributes.

10. The system according to claim 1, wherein the cognitive zone is centrally located within the matrix.

11. The system according to claim 1, wherein the cognitive zone comprises one of a column, row, or single matrix entry.

12. The system according to claim 1, further comprising means for communicating the matrix and the system further comprises at least one video coding station in communication with the at least one processor so as to receive the communicated matrix.

13. The system according to claim 12, wherein the video coding station comprises:
   the means for displaying the matrix to an operator; and
   means for receiving communication from the operator, the communication indicating a relationship between the resolved non-address attributes and the example attributes.

14. The system according to claim 13, wherein the relationship is one of a match and a non-match.

15. The system according to claim 13, wherein the communication comprises a single indicator indicating a relationship of all of the resolved non-address attributes and the example attributes.

16. The system according to claim 1, wherein the non-address attributes comprises at least one of: stamps and pictorial representations.

17. A method for resolving a non-address attribute on a mail piece, comprising the steps of:
   generating a functional resolution of the non-address attribute;
   generating a matrix comprising the functionally resolved non-address attribute and an example non-address attribute in a cognitive zone, wherein the example non-address attribute is a possible match for the unresolved non-address attribute;
   displaying the matrix;
   searching a database for the example non-address attribute;
   ranking results of the searching by degree of matching confidence;
   forwarding the matrix to at least one video coding station for performing the step of displaying the matrix and for operator coding;
   generating a new matrix comprising another example attribute in the cognitive zone;
   the another example attribute having a lower degree of matching confidence than the example attribute; and
   repeating the steps of forwarding and generating until no more example and another example attributes are available and forwarding an image of the mail piece to the video encoding station when no more example and another example attributes are available.

18. The method according to claim 17, further comprising the steps of:
   generating an image of the address face; determining whether the non-address attribute is resolvable with automatic means; and if the non-address attributes is not resolvable with automatic means, generating the functional resolution of the non-address attribute.

19. The method according to claim 17, further comprising the steps of:
   communicating the operator coding to a bar code printer; and
   printing a bar code on the address face based upon the received operator coding.

20. The method according to claim 19, further comprising the step of sorting the mail piece based upon the bar code.

21. The method according to claim 17, further comprising the steps of:
   updating information relating to a tag bar code; and
   sorting the mail piece based upon the updated information.

22. The method according to claim 17, wherein operator coding further comprises the step of comparing the non-address attribute in the cognitive zone with the example non-address attribute.

23. The method according to claim 22, wherein the cognitive zone is centrally located within the matrix.

24. The method according to claim 23, wherein the cognitive zone comprises one of a column, row, or single matrix entry.

25. The method according to claim 17 wherein the non-address attribute comprises at least one of: stamps and pictorial representations.

* * * * *